(12) United States Patent
Johnston

(10) Patent No.: US 6,603,836 B1
(45) Date of Patent: Aug. 5, 2003

(54) INTERACTIVE VOICE RESPONSE APPARATUS CAPABLE OF DISTINGUISHING BETWEEN USER'S INCOMING VOICE AND OUTGOING CONDITIONED VOICE PROMPTS

(75) Inventor: Robert D Johnston, Suffolk (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/043,252

(22) PCT Filed: Nov. 26, 1997

(86) PCT No.: PCT/GB97/03231
§ 371 (c)(1),
(2), (4) Date: Mar. 16, 1998

(87) PCT Pub. No.: WO98/24225
PCT Pub. Date: Jun. 4, 1998

(30) Foreign Application Priority Data

Nov. 28, 1996 (EP) ............................................. 96308590

(51) Int. Cl.[7] .............................................. H04M 3/50
(52) U.S. Cl. .............................. 379/88.16; 379/88.01; 379/88.07; 379/88.04; 379/406.03
(58) Field of Search ........................... 379/88.01, 88.04, 379/88.07, 88.08, 88.16, 88.24, 208, 351, 406, 407, 410, 411, 386, 208.01; 704/200, 231, 233

(56) References Cited

U.S. PATENT DOCUMENTS

| | | | | |
|---|---|---|---|---|
| 3,639,848 A | * | 2/1972 | Elliott | 708/306 |
| 4,521,647 A | * | 6/1985 | Olson et al. | 379/351 |
| 4,624,012 A | * | 11/1986 | Lin et al. | 704/267 |
| 4,914,692 A | * | 4/1990 | Hartwell et al. | 379/410 |
| 4,932,062 A | * | 6/1990 | Hamilton | 704/233 |
| 4,979,214 A | * | 12/1990 | Hamilton | 704/233 |
| 5,050,206 A | * | 9/1991 | Shimanuki | 379/88.04 |
| 5,125,024 A | * | 6/1992 | Gokeen et al. | 379/88.01 |
| 5,155,760 A | * | 10/1992 | Johnson et al. | 379/88.01 |
| 5,471,527 A | * | 11/1995 | Ho et al. | 379/347 |
| 5,475,791 A | * | 12/1995 | Schalk et al. | 704/233 |
| 5,583,933 A | * | 12/1996 | Mark | 379/355 |
| 5,708,704 A | * | 1/1998 | Fisher | 379/410 |
| 5,761,638 A | * | 6/1998 | Knittle et al. | 704/233 |
| 6,061,651 A | * | 5/2000 | Nguyen | 704/233 |
| 6,233,319 B1 | * | 5/2001 | Cox et al. | 379/406.01 |

FOREIGN PATENT DOCUMENTS

| | | | |
|---|---|---|---|
| GB | 2251765 A | | 7/1992 |
| WO | PCT/GB96/00344 | * | 8/1996 |

* cited by examiner

*Primary Examiner*—Fan Tsang
*Assistant Examiner*—Roland G. Foster
(74) *Attorney, Agent, or Firm*—Nixon & Vanderhye P.C.

(57) ABSTRACT

An interactive apparatus allows the user to interrupt an outgoing prompt and remove component which is normally found in the users' responses (e.g., a frequency band) from the outgoing output prompt. An input signal analysis unit in the apparatus is able to detect the response of the user (and distinguish it from an echo of the outgoing prompt) by noting the presence of the component which is lacking from the outgoing prompt. As an alternative, the apparatus may force spaced timeslots in the outgoing signal to silence. In that case, the input signal analysis unit can detect the presence of the user's signal over a predetermined time interval. As well as being applicable to apparatuses which involve the user in prompt/response dialogues, the invention is also useful in relation to the interruption of messages being replayed by voice-controllable answerphones of the like.

13 Claims, 4 Drawing Sheets

INTERACTIVE VOICE RESPONSE APPARATUS CAPABLE OF DISTINGUISHING BETWEEN USER'S INCOMING VOICE AND OUTGOING CONDITIONED VOICE PROMPTS

BACKGROUND OF THE INVENTION

1. Field of the Invention

The present invention relates to an interactive apparatus.

2. Related Art

In recent years, an increasing number of everyday telephone interactions have been automated, thereby removing the need for a human operator to progress the interaction.

One of the first interactions to be automated was simply the leaving of a message for an intended recipient who was not present to take the call. Recently, more complex services such as telephone banking, directory enquiries and dial-up rail timetable enquiries have also been automated. Many answerphones now additionally offer a facility enabling their owner to telephone them and hear messages which have been left. Another service which has now been automated is the reading of stored e-mail messages over the telephone.

In each of the above cases, a user, in effect carries out a spoken dialogue with an apparatus which includes an interactive apparatus, the telephone he or she is using and elements of the Public Switched Telephone Network.

In the spoken dialogue it is often useful if the user is able to interrupt. For example, a user might wish to interrupt if he or she is able to anticipate what information is being requested part way through a prompt. The facility enabling interruption (known as a "barge-in" facility to those skilled in the art) is even more desirable in relation to message playback apparatuses (such as answerphones) where a user may wish to move onto another message without listening to intervening messages.

Providing a barge-in facility is made more difficult if some of the output from the interactive apparatus is fed-back to the input which receives the user's commands. This feedback arises owing to, for example, junctions in the network where voice-representing signals transmitted from the interactive apparatus are reflected back to its input. It is also caused by the acoustic echo of the speech output from the speaker of the user's telephone back to the microphone (this is especially problematic in relation to handsfree operation). There is therefore a need to distinguish fed-back output signals from the user's input in order to provide a more reliable barge-in facility than has hitherto been possible.

According to the present invention there is provided an interactive apparatus comprising:

signal output means arranged in operation to output a signal representative of conditioned speech;

signal input means arranged in operation to receive a signal representative of a user's spoken command;

wherein the conditioned speech lacks a component normally present in speech;

command detection means operable to detect a user's command spoken during issuance of the conditioned speech by detecting the input of a signal which represents speech including the component lacking from the conditioned speech

SUMMARY OF THE INVENTION

The advantage of providing such an apparatus is that it is better able to detect the presence of a user's commands. This is particularly useful in relation to an apparatus which uses a conventional speech recogniser, as the performance of such recognisers falls off sharply if the voice signal they are analysing is in any way corrupted. In an interactive apparatus distortion caused by an echo of the interactive apparatus's output can cause the user's command to be corrupted. The present invention alleviates this problem by enabling the apparatus to stop outputting voice-representing signals or speech as soon as the user's response is detected.

In some embodiments, the apparatus further comprises a means for conditioning signals representative of speech output by the interactive apparatus. Because the quality of recorded speech is better than the quality of speech synthesised by conventional synthesisers, many conventional interactive apparatuses use recorded speech for those parts of the dialogue which are frequently used. However, for apparatuses such as those which are required to output signals representing a spoken version of various telephone numbers or amounts of money it is currently impractical to record a spoken version of every possible output. Hence, such outputs are synthesised when required. A recorded speech signal can be pre-conditioned to lack the said component at the time that the speech signal is recorded. Hence, apparatuses whose entire output is recorded speech do not require a means for conditioning the signals representative of speech to be output by the interactive apparatus. Such apparatuses have the clear advantage of being less complex in their construction and are hence cheaper to manufacture.

Preferably, the said lacking component comprises one or more portions of the frequency spectrum. This has the advantage that the apparatus is easy to implement.

The apparatus is found to be most effective when the portion of the frequency spectrum lies in the range 1000 Hz to 1500 Hz.

Preferably, the width of the frequency band is in the range 80 Hz to 120 Hz. It is found that if the width of the frequency band is greater than 120 Hz then the output which the user hears is significantly corrupted, whereas if the width is less than 80 Hz the conditioning of the output of the interactive apparatus is made more difficult and it also becomes harder to discriminate between situations where the user is speaking and situations where he or she is not.

According to a second aspect of the present invention there is provided a method of detecting a user's spoken command to an interactive apparatus, said method comprising the steps of:

outputting a signal representative of conditioned speech, wherein the conditioned speech lacks a component normally comprised in users' spoken commands;

monitoring signals input to the interactive apparatus for the presence of signals representative of speech including said component; and determining that the input signal represents the user's spoken command on detecting the presence of signals representative of speech including said component.

According to a third aspect of the present invention there is provided a voice-controllable apparatus comprising:

an interactive apparatus according to the first aspect of the present invention;

means for converting said signal representative of conditioned speech to conditioned speech; and means for converting a user's spoken command to a signal representative thereof.

The problems addressed by the present invention also occur in relation to apparatuses which are directly voicecontrolled (i.e. where there is no intermediate communications network). Embodiments of the third aspect of the present invention therefore include, amongst other things, domestic and work-related apparatuses such as personal computers, televisions, and video-recorders offering interactive voice control.

BRIEF DESCRIPTION OF THE DRAWINGS

There now follows a detailed description of a specific embodiment of the present invention. This description is given by way of example only, with reference to the accompanying drawings, in which.

DETAILED DESCRIPTION OF EXEMPLARY EMBODIMENTS

Figure 1:
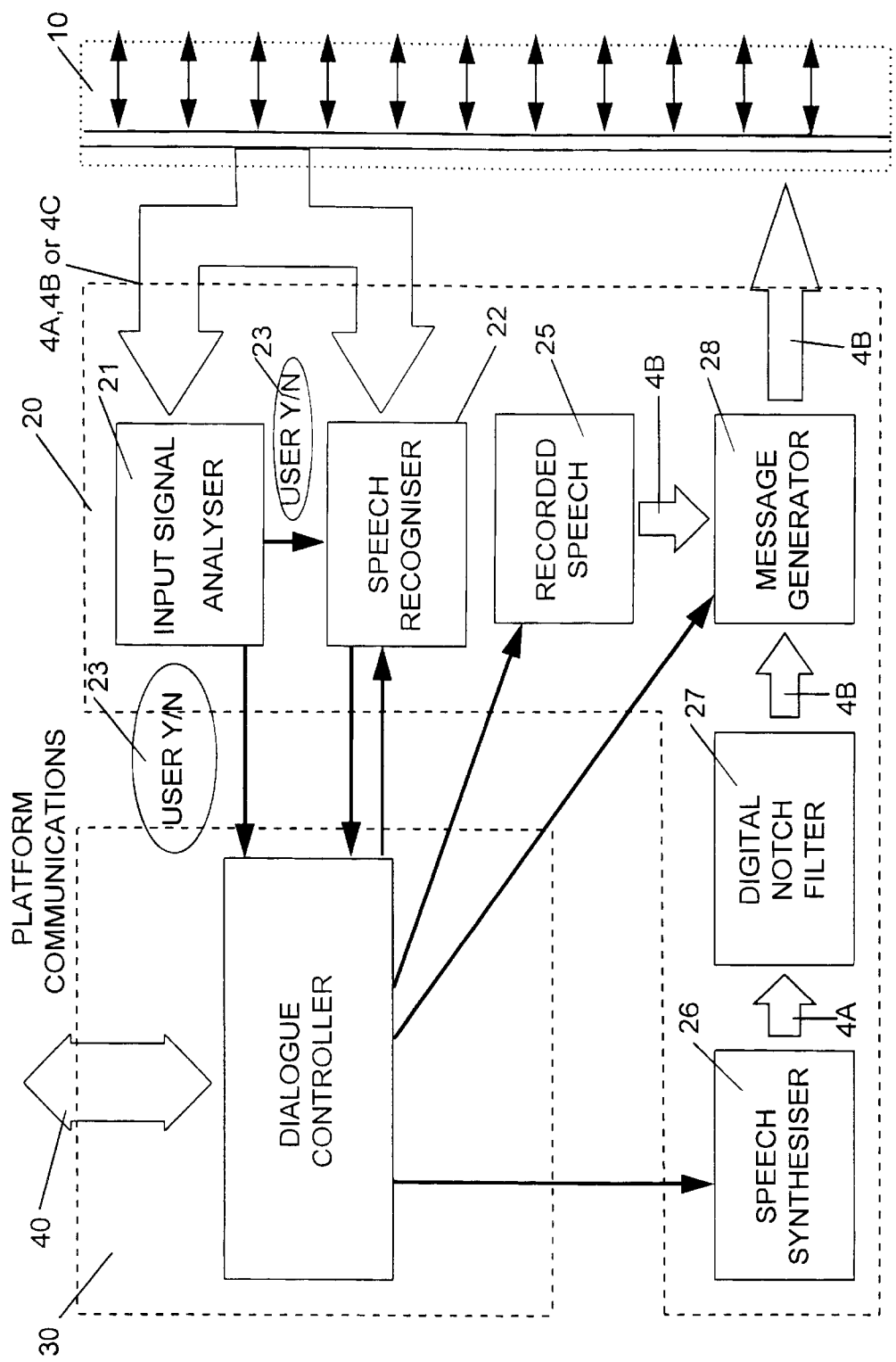
FIG. 1 is a functional block diagram of part of an automated telephone banking apparatus installed in a communications network.

FIG. 1 illustrates a signal processing unit used in providing an automated telephone banking service. In practice, the speech processing unit will be connected by an FDDI (Fibre Distributed Data Interface) local area network to a number of other units such as a telephone signalling unit, a file server unit for providing a large database facility, an assistant back up and data collection unit and an element management unit. A suitable apparatus for providing such a service is the interactive speech applications platform manufactured by Ericsson Ltd.

The speech processing unit (FIG. 1) is interfaced to the telecommunications network via a digital line interface 10. The digital line interface inputs the digital signals which represents the user's voice from the telecommunications network and outputs this digital signal to the signal processing unit 20. The digital line interface 10 also inputs signals representing the spoken messages output by the apparatus from the signal processing unit 20 and modifies them to a form suitable for transmission over the telecommunications network before outputting those signals to the network. The digital line interface 10 is capable of handling a large number of incoming and outgoing signals simultaneously.

A signal processing unit 20 inputs the modified signals representing the user's voice from the digital line interface 10 and carries out a series of operations on those signals under the control of a dialogue controller 30 before outputting a signal representing the spoken response to the user via the digital line interface 10. The signal processing unit 20 includes four output processors 25, 26, 27, 28 and two input processors 21, 22.

The recorded speech output processor 25 is arranged to output a digital signal representing one of a number of messages stored therein which are frequently output by the apparatus. The particular message to be output is determined in accordance with a parameter supplied from the dialogue controller 30. The speech synthesiser processor 26 is used to output digital signals representing synthesised speech. The content of the spoken message is determined by the dialogue controller 30 which sends alphanumeric data representing the content of the message to the speech synthesiser processor 26.

The signal output by the speech synthesiser 26 is input to a digital notch filter 27. For reasons which will be explained below, this filter 27 is arranged to remove components of the synthesised signal lying in a frequency band from 1200 Hz to 1300 Hz. It will be realised that by those skilled in the art that although the speech synthesiser 26 and digital notch filter 27 are illustrated as separate processors, the two functions may be provided on a single processor.

Figure 4A:
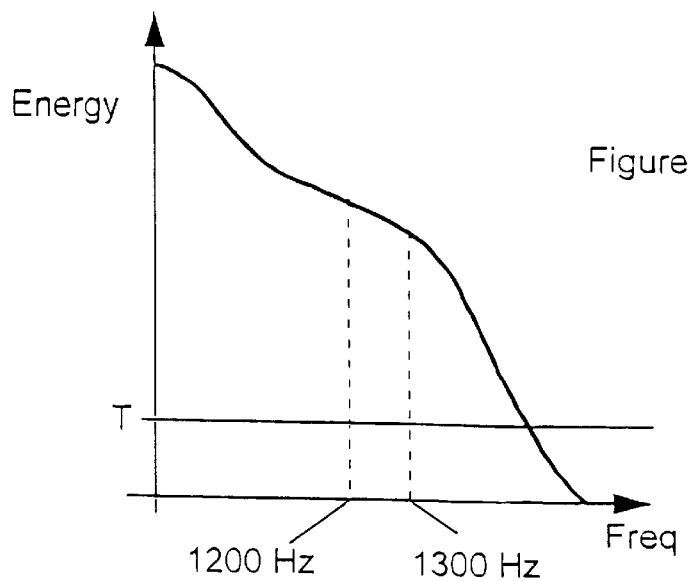
FIG. 4A illustrates the spectrum of the user's voice.

The messages stored in the recorded speech processor 25 are recorded using a filter with a similar transfer function to the digital notch filter 27. Thus, the output of the speech synthesiser processor 26 might have a spectrum similar to that illustrated in FIG. 4A, whereas the output of the digital notch filter 27 or the recorded speech processor 25 might have a spectrum similar to that shown by the solid line in FIG. 4B.

The outputs of the filter 27 and the recorded speech processor 25 are passed to a message generator 28 which, for messages which have both a synthesised portion and a recorded speech portion, concatenates the two parts of the message before outputting the concatenated message via the digital line interface 10 to the user.

The two input signal processors are an input signal analyser 21 and a speech recogniser 22.

The input speech analyser 21 receives the signal representing the user's voice from the digital line interface 10 and passes it through a bandpass filter whose passband extends from 1200 Hz to 1300 Hz. Thereafter, the input signal analyser compares the output of the bandpass filter with a threshold T (see FIG. 4). If the signal strength in the passband lies above the threshold then the input signal analyser outputs a "user present" signal 23 indicative of the fact that the signal being input to it comprises the user's voice. On the other hand, if the signal strength within the passband falls below the threshold, then the analyser outputs an alternative version of the signal 23 to indicate that the signal input to the signal analyser 21 does not comprise the user's voice.

The incoming speech representing signal is also input to the speech recogniser 22 which is supplied with possible acceptable responses by the dialogue controller 30. On the user present signal 23 indicating that the user's voice is comprised in the input signal, the speech recogniser attempts to recognise the current word being spoken by the user and outputs the result to the dialogue controller 30.

The dialogue controller 30 then responds to the word or word spoken by the user in accordance with the software controlling it and controls the output processors in order to provide the user with a suitable response.

Figure 2:
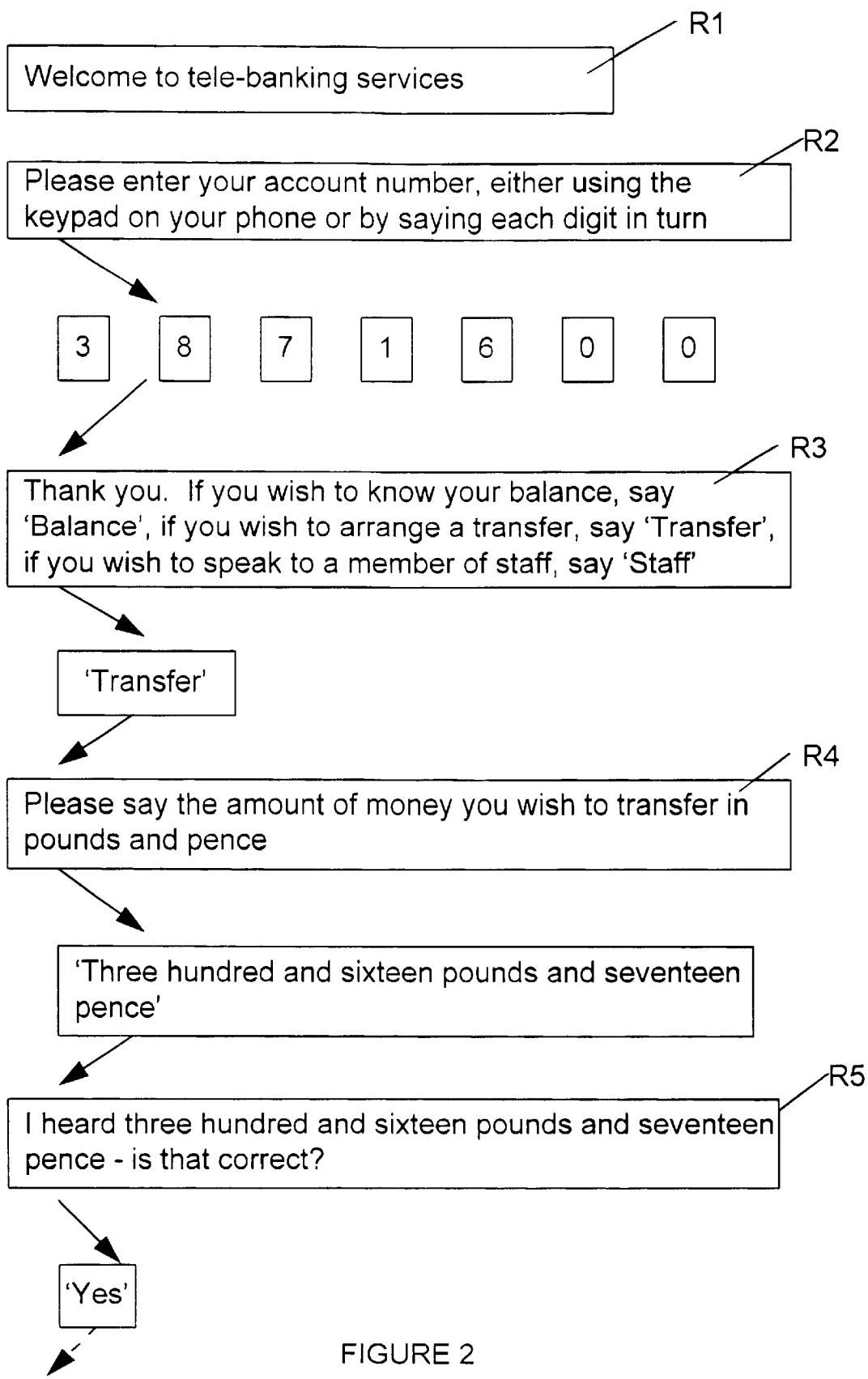
FIG. 2 is a flow diagram representing the progress of a dialogue with a first time user of the apparatus.
Figure 4B:
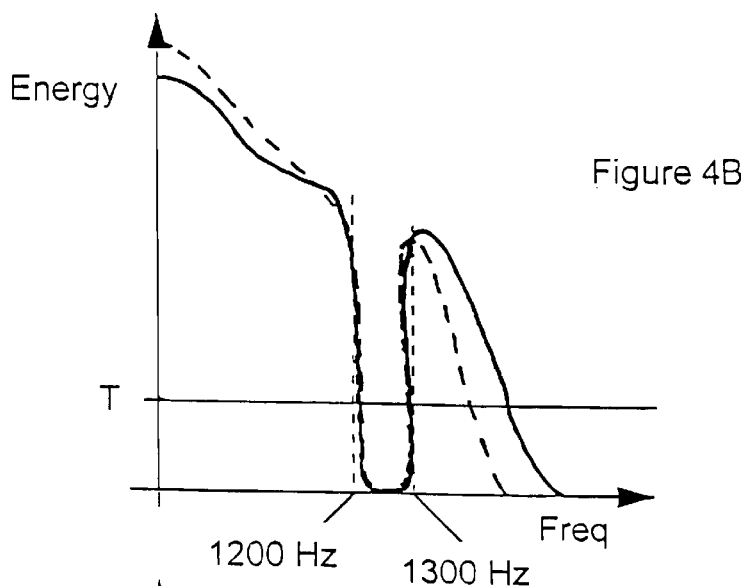
FIG. 4B illustrates the spectrum of the signal output by the apparatus.

A dialogue (FIG. 2) between the automated banking apparatus and an inexperienced user is initiated by the user dialling the telephone number of the apparatus. Once the user is connected to the apparatus the dialogue controller 30 instructs the recorded speech processor 25 to output a welcome message R1, immediately followed by an account number requesting prompt R2. As mentioned above, all recorded messages and prompts stored within the recorded speech processor 25 are recorded so as to have a spectrum similar to the one illustrated by the solid line in FIG. 4B. FIG. 4B shows that the spectrum of the recorded messages lacks any components having a frequency between 1200 Hz and 1300 Hz, but is otherwise normal. On outputting the message, it may be that an echo in the message is received back at the input signal processors 21, 22. Although it is likely that the spectrum will be altered slightly by the reflection process, the reflection process will not introduce frequencies which were not present in the outgoing signal and hence will not introduce frequencies in the frequency band 1200 Hz to 1300 Hz. Nevertheless, it is likely that some noise will be added to the output signal whilst it is being transmitted from the output signal processes 25, 26, 27, 28 to the input signal processes 21, 22. Hence, the spectrum of the echo may be similar to that shown as a dashed line in FIG. 4B.

Returning to FIG. 1, the echo of the prompt R2 is received at the input signal analyser 21 where it is bandpass filtered (the passband extending between 1200 Hz and 1300 Hz), and the resulting signal is compare echo of the outgoing prompt does not contain a significant component in the frequency band 1200 Hz to 1300 Hz, the signal falls below the t hreshold and the input signal analyser 21 outputs the signal 23 indicating, throughout the duration of the prompt R2, that the user is not speaking.

The user then proceeds to enter his account number using the DTMF (Dual Tone Multiple Frequency) keys on his phone. These tones are received by the speech recogniser 22 which converts the tones into numeric data and passes them to the dialogue controller 30. The dialogue controller 30 then forwards the account number to a customer database file server provided on the FDDI local area network. The file server then returns data indicating what services are to be made available in r elation to the is account and other data relating to the customer such as a personal identification number (PIN). Although not shown in FIGS. 2 and 3, the system will ask for the customer to enter his PIN immediately after having requested his account number.

The dialogue controller 30 then instructs the recorded speech processor 25 to output a type-of-service-required prompt R3 which the user is tens to before replying by saying the word "transfer". The user's voice might have a spectrum similar to that shown in FIG. 4A. When a signal representing his voice is passed to the input signal analyser 21, it is found that the signal contains a significant component from the frequency band 1200 Hz to 1300 Hz and hence the input to analyser 21 outputs a signal 23 indicative of the fact the user is speaking to the speech recogniser 22. T he speech recogniser 22 recognises the word currently being input to the apparatus to be "transfer" and passes a signal indicating that that is the word received to the dialogue controller 30.

As a result of having received this response, the dialogue controller 30 then instructs the recorded speech processor 25 to output a prompt asking the user how much money he wishes to transfer. The user then replies saying the amount of money he wishes to transfer, spoken entry of this information being potentially more reliable than information from the telephone keypad because a mistake in entering the DTMF tones may result in the user requesting the transfer of an amount of money which is an order of magnitude more or less than he would wish to transfer.

The user's response is then processed by the speech recogniser 22 and data indicating how much money the user has requested to transfer (£316.17 in this example) is passed the dialogue controller 30. The dialogue controller 30 then instructs the recorded speech processor 25 to send the recorded speech messages "I heard" and "is that correct?" to the message generator 28. The dialogue controller 30 then instructs the speech synthesiser 26 to synthesise a spoken version of £316.17. A synthesised version of these words is output by the speech synthesiser 26 and has a spectrum similar to that shown in FIG. 4A. The signal is then passed through the digital notch filter 27 and is output having a spectrum similar to the solid line spectrum of FIG. 4B. The modified synthesised message is then loaded into the message generator 28.

The message generator 28 then concatenates the two recorded speech messages and the synthesised speech message to provide the prompt R5 which is output via the digital line interface 10 to the user. The dialogue then continues.

Figure 3:
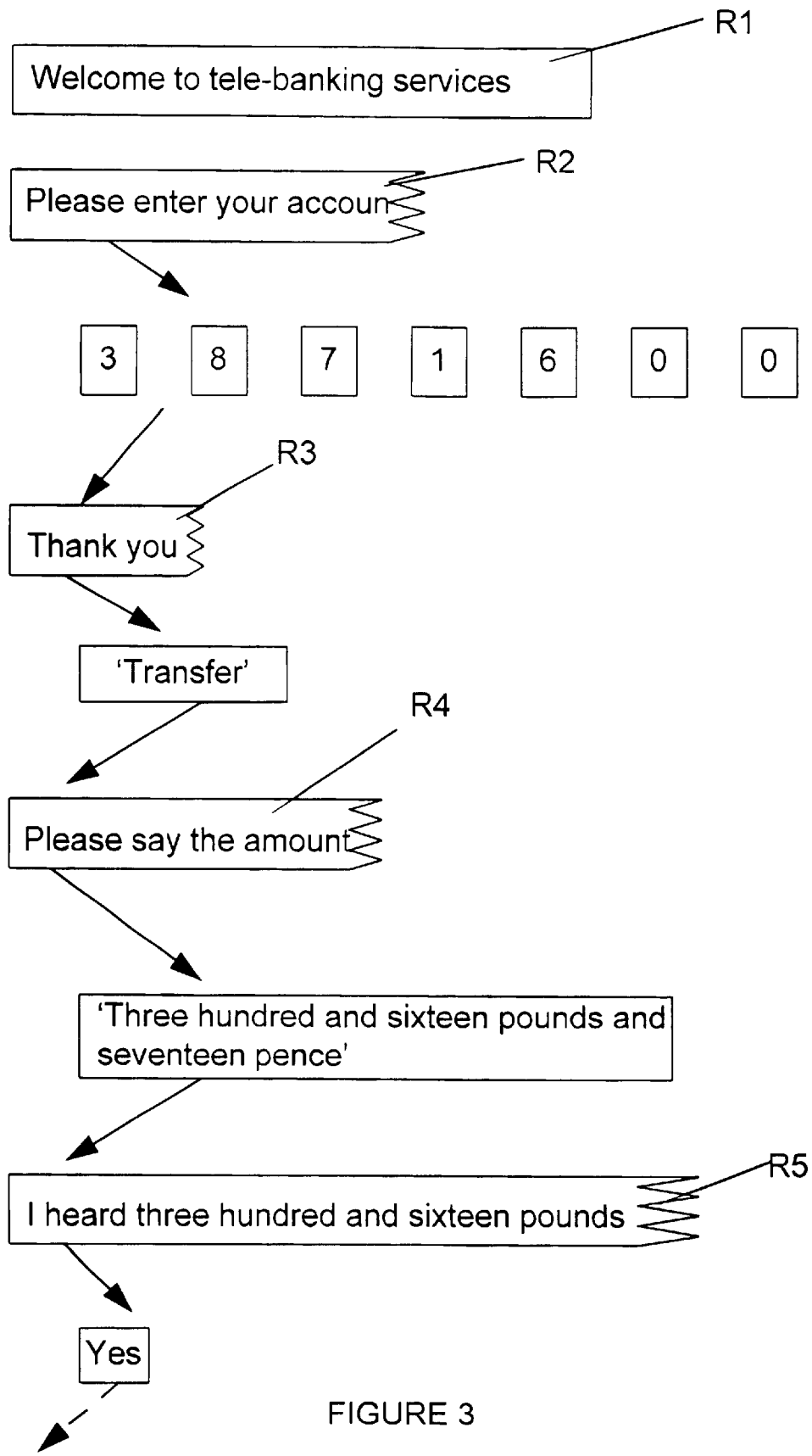
FIG. 3 is a diagram illustrating the progress of the same dialogue with a more experienced user.

A user who is more familiar with the system may carry out a dialogue like that shown in FIG. 3. The initial part of the dialogue is identical to that described in relation to FIG. 2 until the user interrupts the account number requesting prompt R2, using his telephone keypad to enter his account number. The DTMF tones output by his telephone are input to the speech recogniser 22 which converts the tones to the account number representing the data and passes that data to the dialogue controller 30. As soon as the dialogue controller 30 receives this data it sends a signal to the recorded speech processor 25 to halt the output of the account number requesting prompt R2. Clearly, once the apparatus has stopped issuing the prompt R2, no echo of that prompt will be received back at the apparatus. Hence, the speech recogniser can recognise the other DTMF tones input by the user without the presence of the interfering echo.

Figure 4C:
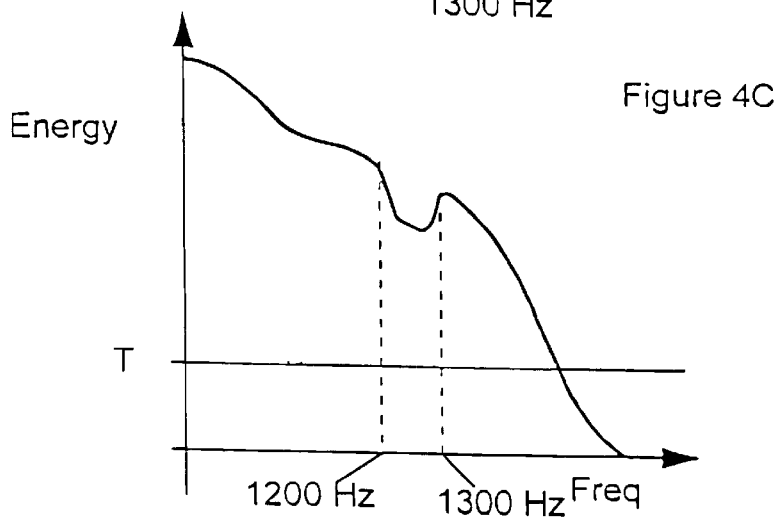
FIG. 4C illustrates the spectrum of the user's voice corrupted by an echo of the apparatus's output.

The dialogue then continues as before until the user interrupts the service required prompt R3 by saying the word "transfer". During the first two words of the message R3, it will be realised that the input signal analyser 21 will be outputting a signal 23 which indicates that the user's voice is not present. However, as the user interrupts the output message, the signal received at the apparatus will be a combination of the user's voice and an echo of the outgoing prompt. The spectrum of this combination signal will be similar to that of the user's voice alone (FIG. 4A), but because the spectrum of the echo signal lacks any components between 1200 Hz and 1300 Hz, will feature a small notch between 1200 Hz and 1300 Hz. (FIG. 4C).

The combination signal is passed to the input signal analyser 21 where it is passed through a bandpass filter and found to have a significant component in the frequency range 1200 Hz to 1300 Hz. The input signal analyser 21 therefore outputs a signal 23 (indicating that the user's voice is present) to both the speech recogniser 22 and the dialogue controller 23. On receiving the signal 23, the dialogue controller 30 instructs the recorded speech processor 25 to halt its output of the prompt R3. Soon after, the echo of the prompt ceases to be a component for signals received at the speech recogniser 22, and the recogniser is better able to recognise the word currently being spoken by the user. Once the response of the user has been recognised, it is passed to the dialogue controller 30.

Thereafter, the user interrupts the next two prompts of the dialogue in a similar way to the way in which he interrupted the type-of-service-required prompt R3.

It will be realised that in the above embodiment, the component lacking from the pre-conditioned spoken prompt comprises a portion of the frequency spectrum. However, it is also envisaged that other components might be lacking. For example, timeslots of short duration (say 1 to 5 ms) could be removed from the spoken prompt at a regular interval (say every 20 ms to 100 ms). If, for example, the speech is digitally sampled at 8 kHz, this might be achieved by setting 8 to 40 samples to a zero value at an 160–800 sample interval. To take a particular value, if 20 samples were to be removed from the signal at a 400 sample interval, then the input signal analyser might be set up such that if it did not detect a corresponding silence or near silence (i.e. where the volume is below a given threshold) during a received signal duration of 800 samples, then it might output a signal indicative that the user is speaking.

It will be seen how the "barge-in" facility allows the user to carry out his transaction more quickly. More importantly, by being able to interrupt the prompt issued by the apparatus in this way, the user feels more in control of the dialogue.

What is claimed is:

1. An interactive apparatus comprising:

signal output means arranged in operation to output an output signal representative of conditioned speech;

signal input means arranged in operation to receive an input signal, said input signal being representative of a user's spoken command on said user issuing a spoken command;

wherein the output signal representing the conditioned speech has had a predetermined speech component removed therefrom, the removed predetermined component being present in the user's spoken command; and command detection means operable to detect a user's command spoken during issuance of the conditioned speech by detecting the presence of said removed predetermined component in said input signal.

2. An apparatus as in claim 1 which further comprises:

means for conditioning a signal representing speech so as to provide said signal representative of said conditioned speech.

3. An apparatus as in claim 2 wherein said conditioning means comprises a digital filter for removing the predetermined component from the conditioned speech.

4. An apparatus as in claim 1 in which said removed predetermined speech component comprises one or more portions of the frequency spectrum.

5. An apparatus as in claim 4 wherein the mid-point of said portion lies in the range 1000 Hz to 1500 Hz.

6. An apparatus as in claim 5 in which the mid-point lies in the range 1200 Hz to 1300 Hz.

7. An apparatus as in claim 4 in which the width of said portion falls within the range 80 Hz to 120 Hz.

8. An apparatus as in claim 1, further comprising:

means for converting said signal representative of conditioned speech to conditioned speech; and means for converting a user's spoken command to a signal representative thereof.

9. A method of detecting a user's spoken command to an interactive apparatus, said method comprising:

outputting a signal representative of conditioned speech, wherein said signal representing conditioned speech has had a speech signal component removed therefrom, the removed signal component being present in users' spoken commands;

monitoring an input signal to the interactive apparatus for the presence of said component; and detecting the presence of the user's spoken command in said input signal by detecting the presence of said removed signal component during issuance of the conditioned speech.

10. A method as in claim 9 further comprising: conditioning a signal representing speech to provide said signal representative of conditioned speech.

11. A communications network including an apparatus as in claim 1.

12. A method according to claim 10 wherein said conditioning involves replacement of temporally spaced short time slots of a speech signal with silence.

13. An interactive apparatus comprising:

signal output means arranged in operation to output a signal representative of conditioned speech;

signal input means arranged in operation to receive a signal representative of a user's spoken command;

wherein the signal representing the conditioned speech has had a speech component removed therefrom, the removed component being present in the signal representing said spoken command;

wherein the removed component is a frequency within one or more portions of the frequency spectrum between 80 Hz and 1500 Hz or a plurality of spaced short time segments; and command detection means operable to detect a user's command spoken during issuance of the conditioned speech by detecting the component removed from the signal representing the conditioned speech in an input provided to the signal input means.

* * * * *